US007833457B2

(12) United States Patent
Ishibashi et al.

(10) Patent No.: US 7,833,457 B2
(45) Date of Patent: *Nov. 16, 2010

(54) METHOD FOR PRODUCING BIREFRINGENT FILM, OPTICAL FILM AND IMAGE DISPLAY DEVICE USING THE SAME

(75) Inventors: Kuniaki Ishibashi, Ibaraki (JP); Kazuki Tsuchimoto, Ibaraki (JP); Hiroyuki Yoshimi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 638 days.

This patent is subject to a terminal disclaimer.

(21) Appl. No.: 10/554,224

(22) PCT Filed: Oct. 1, 2004

(86) PCT No.: PCT/JP2004/014479

§ 371 (c)(1),
(2), (4) Date: Oct. 24, 2005

(87) PCT Pub. No.: WO2005/059609

PCT Pub. Date: Jun. 30, 2005

(65) Prior Publication Data

US 2006/0275559 A1 Dec. 7, 2006

(30) Foreign Application Priority Data

Dec. 16, 2003 (JP) .............................. 2003-418558

(51) Int. Cl.
*B29C 55/00* (2006.01)
(52) U.S. Cl. ..................... 264/290.2; 264/291; 264/134
(58) Field of Classification Search ............. 264/290.2, 264/217, 235.8, 291, 134; 156/229, 212, 156/406; 349/117; 428/1.31
See application file for complete search history.

(56) References Cited

U.S. PATENT DOCUMENTS

| 3,229,175 | A | 1/1966 | Standberg |
| 5,241,030 | A | 8/1993 | Barry et al. |
| 5,245,456 | A | 9/1993 | Yoshimi et al. |
| 5,344,916 | A | 9/1994 | Harris et al. |
| 5,366,682 | A | 11/1994 | Morikawa et al. |
| 5,402,556 | A | 4/1995 | Rutz |
| 5,430,565 | A | 7/1995 | Yamanouchi et al. |
| 5,519,523 | A | 5/1996 | Madokoro et al. |
| 5,999,243 | A | 12/1999 | Kameyama et al. |
| 6,542,300 | B2 | 4/2003 | Umemoto |
| 6,606,193 | B2 | 8/2003 | Umemoto |
| 6,939,499 | B2 | 9/2005 | Merrill et al. |
| 7,075,604 | B2 | 7/2006 | Yano et al. |
| 7,229,271 | B2 | 6/2007 | Merrill et al. |
| 7,455,801 | B2 | 11/2008 | Nakashima |
| 2002/0008840 | A1* | 1/2002 | Sakamaki et al. ........... 349/194 |
| 2002/0130997 | A1 | 9/2002 | Yano et al. |
| 2002/0190406 | A1 | 12/2002 | Merrill et al. |
| 2003/0020208 | A1 | 1/2003 | Tasaka et al. |
| 2004/0022965 | A1* | 2/2004 | Sakamaki et al. .......... 428/1.31 |
| 2004/0052937 | A1 | 3/2004 | Ito et al. |
| 2004/0058093 | A1* | 3/2004 | Nakashima ................. 428/1.1 |
| 2004/0099992 | A1 | 5/2004 | Merrill et al. |
| 2004/0119178 | A1* | 6/2004 | Kuwamura ................ 264/1.34 |
| 2004/0241344 | A1 | 12/2004 | Kawanishi et al. |
| 2005/0018328 | A1 | 1/2005 | Hata et al. |
| 2005/0099562 | A1 | 5/2005 | Nishikouji et al. |
| 2005/0213012 | A1 | 9/2005 | Yano et al. |
| 2006/0077326 | A1 | 4/2006 | Ishibashi et al. |
| 2006/0078693 | A1* | 4/2006 | Ishibashi et al. ........... 428/1.31 |
| 2006/0262401 | A1* | 11/2006 | Takahashi et al. .......... 359/494 |
| 2006/0275559 | A1 | 12/2006 | Ishibashi et al. |

FOREIGN PATENT DOCUMENTS

| EP | 1 160 591 A1 | 12/2001 |
| JP | 2-191904 | 7/1990 |
| JP | 3-23405 | 1/1991 |
| JP | 05011114 A | 1/1993 |
| JP | 5-249316 | 9/1993 |
| JP | 6-51116 | 2/1994 |
| JP | 06051119 A | 2/1994 |

(Continued)

OTHER PUBLICATIONS

Office Action of Corresponding Korean Patent Application No. 10-2005-7019368 mailed Oct. 31, 2006.
Japanese Office Action dated Oct. 14, 2008 (mailing date), issued in corresponding Japanese Patent Application No. 2003-418558.
Korean Office Action dated Oct. 31, 2006, issued in Korean Patent Application No. 10-2005-7019368.
English language machine translation of JP-04-305602. Oct. 28, 1992. Umemoto et al.
English language machine translation of JP-2000-131693. May 12, 2000. Omuro et al.
English language machine translation of JP-2005-181450. Jul. 7, 2005. Ishibashi et al.

(Continued)

*Primary Examiner*—Khanh Nguyen
*Assistant Examiner*—Saeed M Huda
(74) *Attorney, Agent, or Firm*—Westerman, Hattori, Daniels & Adrian, LLP

(57) ABSTRACT

A birefringent film with excellent uniformity in in-plane retardation, retardation in the thickness direction, and alignment axis is provided. The birefringent film is produced in such a manner that, in the step of stretching a polymer film, the polymer film is stretched in a width direction while being shrunk in a longitudinal direction, and assuming that lengths in the width direction and the longitudinal direction of the polymer film before being stretched are 1, a change ratio (STD) of the length in the width direction of the polymer film resulting from the stretching and a change ratio (SMD) of the length in the longitudinal direction of the polymer film resulting from the shrinking satisfy the following formula (1).

$$(1/STD)^{1/2} \leq SMD < 1 \quad (1)$$

7 Claims, No Drawings

FOREIGN PATENT DOCUMENTS

| | | |
|---|---|---|
| JP | 8-511812 | 12/1996 |
| JP | 10-508048 | 8/1998 |
| JP | 2000-190385 A | 7/2000 |
| JP | 2000-511296 | 8/2000 |
| JP | 2001-49110 | 2/2001 |
| JP | 2001-343529 | 12/2001 |
| JP | 2002090530 A | 3/2002 |
| JP | 2002-296422 | 10/2002 |
| JP | 2003-315554 | 11/2003 |
| JP | 2004144942 A | 5/2004 |
| KR | 1991-0000870 A | 1/1991 |
| KR | 2003-0022791 A | 3/2003 |
| WO | WO 94/24191 | 10/1994 |
| WO | WO 96/11967 | 4/1996 |
| WO | WO 97/44704 | 11/1997 |
| WO | 02092671 A1 | 11/2002 |

OTHER PUBLICATIONS

Japanese Office Action dated Feb. 19, 2010, issued in corresponding Japanese Patent Application No. 2005-034644 (With Translation).
Japanese Office Action dated Feb. 19, 2010, issued in Japanese Patent Application No. 2005-034645 (With Translation).
Chinese Office Action dated Jul. 6, 2007 issued in Application No. 200510108461.1.
JPO Website English language Machine Translation of JP2002-269781, Nakajima Hiroshi, Apr. 8, 2004.
T. Yamada et al.; "Analyses of Bowing Phenomena in Successive Transverse Stretching and Thermosetting Process for Biaxially Oriented Film", Intern. Polymer Processing, vol. X, 1995, pp. 334-340. Cited in spec.
Japanese Office Action dated Aug. 17, 2010, issued in corresponding Japanese Patent Application No. 2003-418558.

* cited by examiner

METHOD FOR PRODUCING BIREFRINGENT FILM, OPTICAL FILM AND IMAGE DISPLAY DEVICE USING THE SAME

TECHNICAL FIELD

The present invention-relates to a method for producing a birefringent film, and also to an optical film and various image displays using the birefringent film.

BACKGROUND ART

In various image displays such as a liquid crystal display, a birefringent film generally is used for the purpose of, for example, solving coloring or widening a viewing angle, in order to improve display characteristics. In general, such a birefringent film is produced by stretching a polymer film uniaxially or biaxially so as to adjust the birefringence or retardation of the polymer film.

In the case where such a birefringent film is used in a liquid crystal display together with a polarizing film, it is generally necessary to arrange the birefringent film and the polarizing film so that the slow axis of the birefringent film is parallel to the transmission axis of the polarizing film. In general, the direction of the slow axis of a birefringent film coincides with the film stretching direction, while the direction of the transmission axis of a polarizing film coincides with the direction perpendicular to the film stretching direction.

However, arranging the birefringent film and the polarizing film in the above-described manner involves the following problem in production. That is, when a polymer film is stretched by an industrial process, the polymer film generally is moved in the longitudinal direction so as to be wound around a roller while being subjected to a stretching treatment. When the birefringent film and the polarizing film that have been respectively wound around rollers as described above are attached to each other, continuous attaching can be achieved by winding them again around a roller while attaching them to each other in the state where the longitudinal directions of the respective films are directed in the same direction. Accordingly, in order to arrange these films so that the transmission axis and the slow axis are parallel to each other and attach them continuously, it is necessary that the polarizing film is stretched in the longitudinal direction whereas the birefringent film is stretched in the width direction. That is to say, in order to allow the direction of the transmission axis of the polarizing film (i.e., the direction perpendicular to the stretching direction) and the direction of the slow axis of the birefringent film (i.e., the stretching direction) to be the width directions of the respective films, the birefringent film needs to be stretched in the width direction. However, if a polymer film is stretched in the width direction continuously to produce a birefringent film, a so-called bowing phenomenon may occur so that an alignment axis within the plane of the film has a fan-like shape, for example. Therefore, it is difficult to achieve uniformity in alignment axis, birefringence, and retardation by stretching the polymer film in the width direction.

On this account, as a method of stretching a polymer film in the width direction, there has been employed a method in which a polymer film that has been stretched in the width direction is then subjected to a relaxation treatment for causing the width thereof to return to the original width, thereby improving the uniformity in slow axis in the width direction (the stretching direction). However, since the polymer film generally is formed on a base directly and then is stretched together with the base, the method may be affected by variation in physical properties of the base. Moreover, depending on the type of the polymer film, sufficient relaxing effect cannot be obtained. Therefore, according to this method, it is difficult to produce uniform birefringent films stably by an industrial process. Furthermore, although there has been an attempt to suppress the bowing phenomenon by cooling the polymer film after stretching, this cannot avoid the bowing phenomenon completely (e.g., Non-patent Document 1). Also, there has been disclosed a method in which a base on which a polymer film is formed is held between chucks of a tenter stretching machine in a loosened manner and the base is then heat-shrunk (e.g., Patent Document 1). However, this method has problems that the base used is limited to a heat shrinkable base and that, if the base is too thick, wrinkles may be formed when loosening the base, thereby making it difficult to loosen the base stably. Other than the above-described methods, there have been disclosed methods in which conditions for carrying out film stretching are determined, such as, for example, a method in which the width of a stretched film is set to be the square root of a stretch ratio (e.g., Patent Document 2), a method in which the width by which a film shrinks due to stretching in the longitudinal direction is defined (e.g., Patent Document 3), and a method in which a film that has been stretched is subjected to thermal relaxation (e.g., Patent Document 4). However, from an industrial viewpoint, it is difficult to produce birefringent films stably according to these methods.

Non-patent Document 1: T. Yamada et al. Intn. Polym. Process., Vo. X, Issue 4, 334-340 (1995)

Patent Document 1: JP 6(1994)-51116 A

Patent Document 2: JP 3(1991)-23405 A

Patent Document 3: JP 2(1990)-191904 A

Patent Document 4: JP 5(1993)-249316 A

DISCLOSURE OF INVENTION

Problem to be Solved by the Invention

With the foregoing in mind, it is an object of the present invention to provide a method for producing a birefringent film by stretching a polymer film in the width direction, by which it is possible to produce a birefringent film that has excellent appearance and also excellent uniformity in optical characteristics with variations in birefringence, retardation, and alignment axis angle being suppressed.

Means for Solving Problem

In order to achieve the above object, a method for producing a birefringent film according to the present invention is characterized in that, in the step of stretching a polymer film, the polymer film is stretched in a width direction while being shrunk in a longitudinal direction (a direction perpendicular to the width direction), and based on the lengths in the width direction and the longitudinal direction of the polymer film before being stretched, a change ratio (STD) of the length in the width direction of the polymer film resulting from the stretching and a change ratio (SMD) of the length in the longitudinal direction of the polymer film resulting from the shrinking satisfy a relationship represented by the following formula (1). In the present invention, the change ratio (STD) of the length in the width direction of the polymer film resulting from the stretching and the change radio (SMD) of the length in the longitudinal direction of the polymer film resulting from the shrinking may be calculated assuming that lengths in the width direction and the longitudinal direction of the polymer film before being stretched are 1.

$$(1/STD)^{1/2} \leq SMD < 1 \tag{1}$$

Effects of the Invention

By causing the polymer film to be stretched in the width direction while being shrunk in the longitudinal direction and setting the degree of stretching in the width direction and the degree of shrinking in the longitudinal direction so as to satisfy the requirement represented by the formula (1) as described above, it is possible to efficiently obtain a birefringent film that has excellent appearance and also excellent optical characteristics with refractive indices in the in-plane direction and the thickness direction being controlled precisely and a birefringence, a retardation and an alignment axis, especially an alignment axis accuracy in the width direction, being uniform. A birefringent film obtained by such a production method can improve, for example, display characteristics of various image displays such as a liquid crystal display due to its properties. Besides, the birefringent film can be attached to a polarizing film continuously as described above. Hence, the birefringent film is very useful from an industrial viewpoint.

Note here that an idea of causing the polymer film to be stretched in the width direction while being shrunk in the longitudinal direction and setting a condition for performing the stretching and shrinking so as to satisfy the formula (1) as described above is newly discovered by the inventors of the present invention through in-depth research. More specifically, the inventors of the present invention compared deformation of a polymer film caused by conventional stretching in the width direction and deformation of a polymer film caused by conventional stretching in the longitudinal direction, and focused on the fact that these deformations exhibited the behavior as shown in Table 1 below. Table 1 shows change ratios of a polymer film in three dimensions (i.e., the longitudinal direction, the width direction, and the thickness direction). In Table 1, the change ratios are represented as values obtained assuming that the width, the length, and the thickness of the polymer film before being stretched are "1", and STD represents the change ratio in the width direction while SMD represents the change ratio in the longitudinal direction. That is, the inventors of the present invention focused on the fact that, as shown in Table 1, the conventional stretching in the width direction causes no deformation in the longitudinal direction, which may be one reason why the bowing phenomenon occurs, whereas, according to the conventional stretching in the longitudinal direction, it is generally easy to cause desired deformations in the width direction and the thickness direction. Based on this finding, the inventors conducted in-depth research, thereby arriving at the present invention.

TABLE 1

|  |  | Deformation in longitudinal direction | Deformation in width direction | Deformation in thickness direction |
|---|---|---|---|---|
| Prior art | Stretching in width direction | 1 | STD | 1/STD |
| Prior art | Stretching in longitudinal direction | SMD | STD = $(1/SMD)^{1/2}$ | $(1/SMD)^{1/2}$ |

TABLE 1-continued

|  |  | Deformation in longitudinal direction | Deformation in width direction | Deformation in thickness direction |
|---|---|---|---|---|
| Present invention | Stretching + Shrinking | $(1/STD)^{1/2} \leq$ SMD | STD | $(1/SMD)^{1/2}$ |

BEST MODE FOR CARRYING OUT THE INVENTION

As described above, the method for producing a birefringent film according to the present invention is characterized in that, in the step of stretching the polymer film, the polymer film is stretched in a width direction while being shrunk in a longitudinal direction, and assuming that lengths in the width direction and the longitudinal direction of the polymer film before being stretched are 1, a change ratio (STD) of the length in the width direction of the polymer film resulting from the stretching and a change ratio (SMD) of the length in the longitudinal direction of the polymer film resulting from the shrinking satisfy the following formula (1). In the present invention, in the case of a rectangular polymer film, the longitudinal direction refers to a direction along which the distance between both ends of the polymer film is longer and the width direction refers to a direction perpendicular to the longitudinal direction. On the other hand, in the case of a square polymer film, it is only required that both the directions are perpendicular to each other.

$$(1/STD)^{1/2} \leq SMD < 1 \tag{1}$$

In the case where "SMD=1", i.e., the size of the polymer film in the longitudinal direction does not change, the problem of the occurrence of the bowing phenomenon cannot be solved. On the other hand, in the case where "$(1/STD)^{1/2}$>SMD", wrinkles may be formed in the width direction of the polymer film, thereby causing a problem in terms of appearance.

In the formula (1), it is preferable that SMD=$(1/STD)^{1/2}$. Furthermore, it is preferable that the SMD specifically is less than 0.99, more preferably in the range from 0.85 to 0.95, and particularly preferably in the range from 0.88 to 0.93. Moreover, in the formula (1), $(1/STD)^{1/2}$ preferably is less than 0.99, more preferably in the range from 0.85 to 0.95, and particularly preferably in the range from 0.88 to 0.93, so that the STD preferably is less than 1.5, more preferably not less than 1.01 and less than 1.5, and particularly preferably in the range from 1.1 to 1.3. More specifically, when the STD is 1.2, the SMD preferably is in the range from 0.9 to 0.92, and when the STD is 1.3, the SMD preferably is in the range from 0.86 to 0.90. In the case where SMD=$(1/STD)^{1/2}$ in the formula (1), which is a preferable requirement in the present invention, the change ratios of the polymer film in the three dimensions are presumed to be as follows, for example: SMD=$(1/STD)^{1/2}$ in the longitudinal direction, the STD in the width direction, and $(1/STD)^{1/2}$ in the thickness direction.

The stretching treatment and the shrinking treatment to be performed at the same time as described above may be performed directly with respect to the polymer film. Alternatively, the polymer film may be disposed on the base and then the base may be subjected to the stretching treatment and the shrinking treatment, thereby treating the polymer film indirectly, or the laminate of the base and the polymer film may be subjected to the stretching treatment and the shrinking treatment at the same time.

The polymer film is not particularly limited, and may be a film formed of a polymer conventionally well known as a material for forming a birefringent film. Examples of the polymer include polycarbonate; polyalylate; polysulfone; polyesters such as polyethylene terephthalate (PET) and polyethylene naphthalate; polyethersulfone; polyvinyl alcohol; polyolefins such as polyethylene and polypropylene; cellulose-based polymers; polystyrene, polymethacrylate; polyvinyl chloride; polyvinylidene chloride; polyamide; norbornene-based polymers; and mixtures containing an alternating copolymer of isobutene and N-methyl maleimide and an acrylonitrile-styrene copolymer.

It is preferable that the polymer film is, for example, optically transparent, and the light transmittance thereof preferably is not less than 85%, more preferably 90%, for example. Furthermore, it is preferable that unevenness in alignment is small.

In the case where a polymer film is formed on a base directly, it is preferable to use non-liquid crystal polymers listed below, for example. A non-liquid crystal polymer can form a birefringent film exhibiting optically negative uniaxiality ("nx>nz" and "ny>nz") only by being coated on a base according to its own nature, regardless of the aligning property of the base. Moreover, by stretching the thus-obtained birefringent film, the optical characteristics of the birefringent film can be changed so as to exhibit negative biaxiality ("nx>ny>nz"). Accordingly, the birefringence and the retardation can be adjusted still more easily, and besides, the base to be used in not limited to an alignment base. Note here that nx, ny and nz respectively represent refractive indices in an X-axis direction (i.e., a slow axis direction), a Y-axis direction, and a Z-axis direction in the polymer film, with the X-axis direction being an axial direction exhibiting a maximum refractive index within a plane of the polymer film, the Y-axis direction being an axial direction perpendicular to the X axis within the plane, and the Z-axis direction being a thickness direction perpendicular to the X axis and the Y axis.

The non-liquid crystal polymer preferably is polyamide, polyimide, polyester, polyetherketone, polyaryletherketone, polyamide imide, polyesterimide, or the like because of its excellent heat resistance, chemical resistance, transparency, and hardness. It may be possible to use one of these polymers alone or a mixture of two or more polymers having different functional groups, for example, a mixture of polyaryletherketone and polyamide. Among these polymers, polyimide or the like is particularly preferable because high birefringence can be obtained.

The molecular weight of the above-mentioned polymer is not particularly limited, but the weight-average molecular weight (Mw) thereof preferably ranges from 1,000 to 1,000,000 and more preferably ranges from 2,000 to 500,000.

As the polyimide, it is preferable to use a polyimide that has a high in-plane alignment and is soluble in an organic solvent. For example, it is possible to use a condensation polymer of 9,9-bis(aminoaryl)fluorene and an aromatic tetracarboxylic dianhydride disclosed in JP 2000-511296 A, more specifically, a polymer containing at least one repeating unit represented by the formula (1) below.

[Chemical Formula 1]

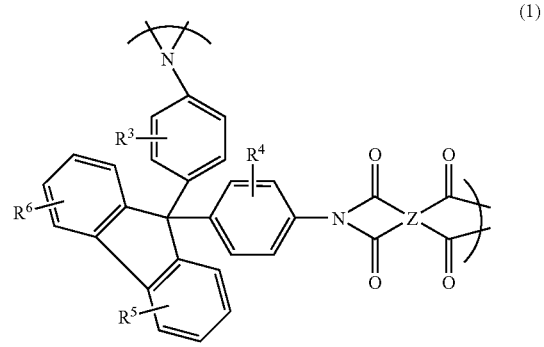

(1)

In the above formula (1), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group or a group represented by the formula (2) below.

[Chemical Formula 2]

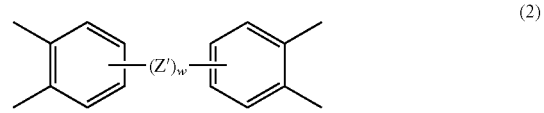

(2)

In the formula (2) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the formula (5) below is a preferable mode of the homopolymer represented by the formula (3).

[Chemical Formula 3]

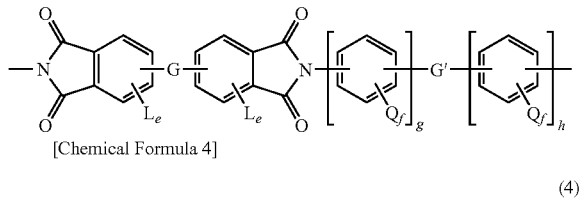

(3)

[Chemical Formula 4]

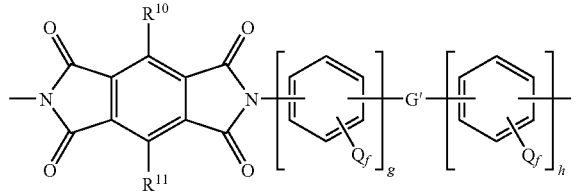

(4)

[Chemical Formula 5]

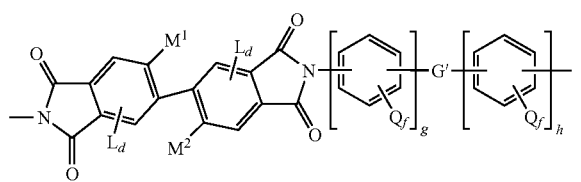

(5)

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX3)_2$ group (wherein X is halogen), a CO group, an S atom, an O atom, an $SO_2$ group, an $Si(CH_2CH_3)_2$ group and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (3) includes polyimide represented by the formula (6) below.

[Chemical Formula 6]

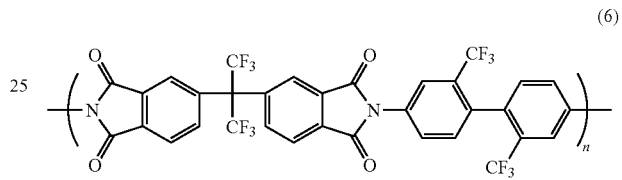

(6)

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2, 5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic anhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl) propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether or 4,4'-diaminodiphenylsulfone.

The polyetherketone as a material for forming the birefringent film may be, for example, polyaryletherketone represented by the general formula (7) below, which is disclosed in JP 2001-49110 A.

[Chemical Formula 7]

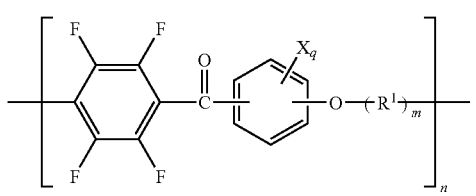

(7)

In the above formula (7), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ straight or branched chain lower alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

[Chemical Formula 8]

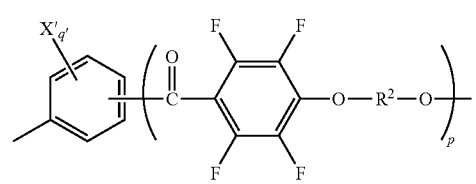

(8)

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the formulae (9) to (15) below.

[Chemical Formula 9]

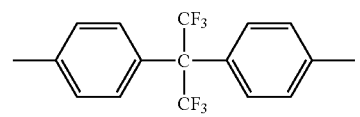

(9)

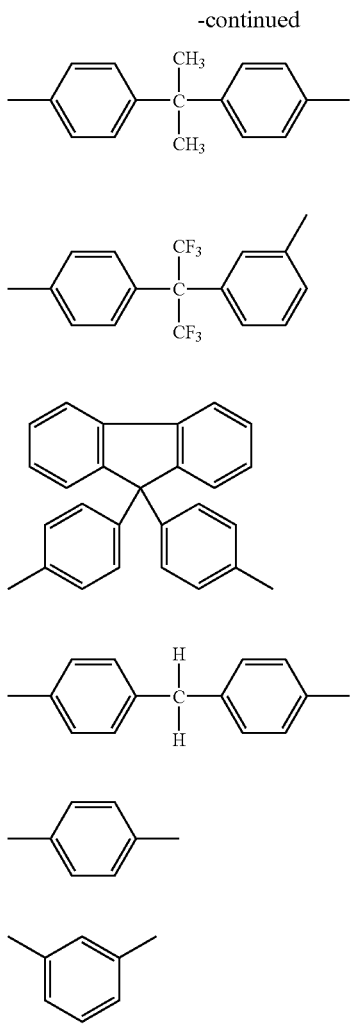

(10)

(11)

(12)

(13)

(14)

(15)

In the above formula (7), the $R^1$ preferably is a group represented by the formula (16) below, wherein $R^2$ and p are equivalent to those in the above-noted formula (8).

[Chemical Formula 10]

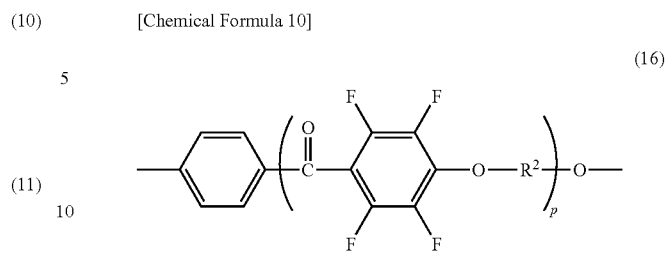

(16)

Furthermore, in the formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below. In the formula below, n indicates a degree of polymerization as in the formula (7).

[Chemical Formula 11]

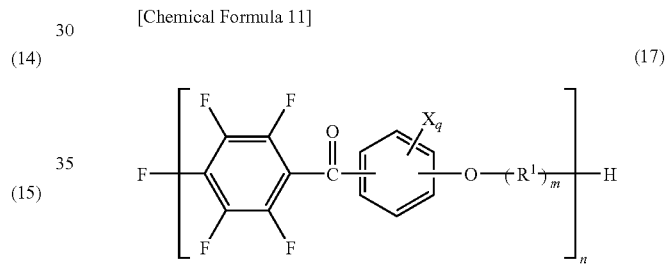

(17)

Specific examples of the polyaryletherketone represented by the formula (7) may include those represented by the formulae (18) to (21) below, wherein n indicates a degree of polymerization as in the formula (7).

[Chemical Formula 12]

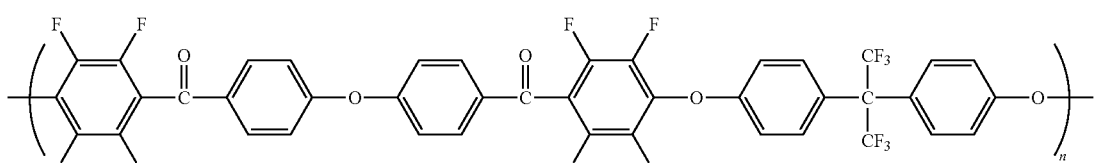

(18)

[Chemical Formula 13]

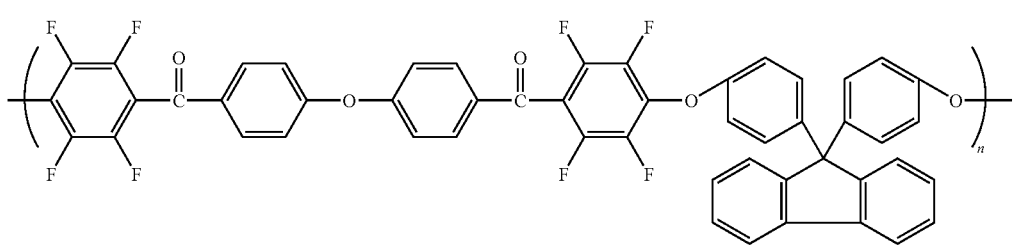

(19)

[Chemical Formula 14]

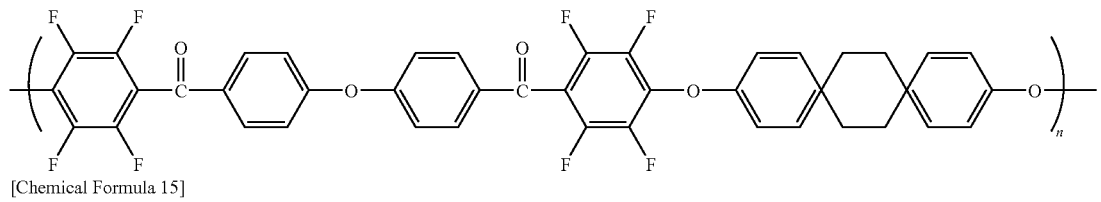

(20)

[Chemical Formula 15]

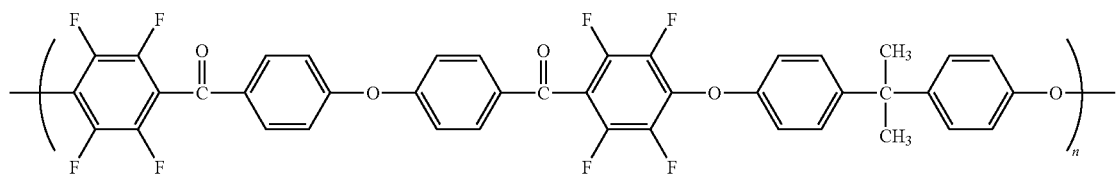

(21)

Other than the above, the polyamide or polyester as a material for forming the birefringent film may be, for example, polyamide or polyester described by JP 10(1998)-508048 A, and their repeating units can be represented by the general formula (22) below.

[Chemical Formula 16]

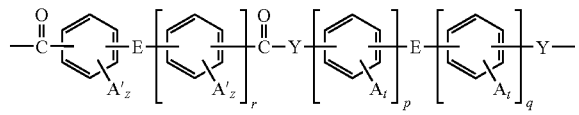

(22)

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an N(R) group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the formula (22) above, the repeating unit represented by the general formula (23) below is preferable.

[Chemical Formula 17]

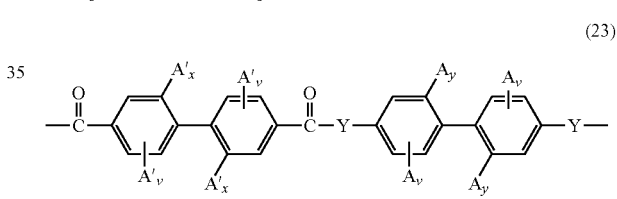

(23)

In the formula (23), A, A' and Y are those defined by the formula (22), and v is an integer from 0 to 3, preferably is an integer from 0 to 2. Although each of x and y is 0 or 1, not both of them are 0.

On the other hand, as the base, an optically transparent polymer film that can be stretched or shrunk is preferable. In particular, a polymer film that does not cause retardation when stretched is preferable from the aspect of practical use. Furthermore, a polymer film having excellent transparency is particularly preferable as the base because the laminate of this base and a birefringent film formed thereon can be used as an optical film as it is, for example. Also, in order to allow the above-described shrinking in the longitudinal direction to be carried out smoothly, a previously stretched film, a heat shrinkable film or the like preferably is used as the base, and a material for forming such a base preferably is a thermosetting resin, for example.

Specific examples of a material for forming the base include polyolefins such as polyethylene, polypropylene and poly(4-methylpentene-1), polyimide, polyamide imide, polyamide, polyetherimide, polyether ether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyalylate, acrylic resins, polyvinyl alcohols, polypropylene, cellulose-based plastics, epoxy resins, phenol resins, acetate resins such as triacetylcellulose (TAC), polyester resins, acrylic resins, polynorbornene resins, cellulose resins, polystyrene resins, polyvinyl alcohol resins, polyvinyl chloride resins, polyvinylidene chloride resins, polyacrylic resins, and mixtures thereof Also, liquid crystal polymers and the like can be used. Among them, polypropylene, polyethylene terephthalate, polyethylene naphthalate and the like are preferable, for example, considering a solvent resistance and a heat resistance. Also, the material for forming the base can be a mixture of a thermoplastic resin whose side chain has a substituted or unsubstituted imido group and a thermoplastic resin whose side chain has a substituted or unsubstituted phenyl group and a nitrile group as described in JP 2001-343529 A (WO 01/37007), for example. Specific examples of the mixture include a resin composition containing an alternating copolymer of isobutene and N-methyl maleimide and an acrylonitrile-styrene copolymer. Among these materials, a mixture of a thermoplastic resin whose side chain has a substituted or unsubstituted imido group and a thermoplastic resin whose side chain has a substituted or unsubstituted phenyl group and a nitrile group is preferable, for example.

Next, an example of a method for producing a birefringent film according to the present invention will be described.

First, a polymer film to be stretched and shrunk is provided. The thickness of the polymer film is not particularly limited, and can be determined as appropriate depending on a desired retardation of the resultant birefringent film, the material of the polymer film, etc. In general, the thickness of the polymer film is, for example, in the range from 5 to 500 μm, preferably from 10 to 350 μm, and more preferably from 20 to 200 μm. If the thickness of the polymer film is within the above-described range, the film can have a sufficient strength so that, for example, fracture during stretching and shrinking can be prevented. Moreover, the lengths of the polymer film in the longitudinal direction and the width direction also are not particularly limited, and may be determined as appropriate depending on the size of a stretching machine to be used etc., for example.

This polymer film is stretched in the width direction while being shrunk in the longitudinal direction so as to satisfy the requirement represented by the above formula (1). The stretching in the width direction and the shrinking in the longitudinal direction can be carried out, for example, by using a biaxial stretching machine. More specifically, it is possible to use a high-performance thin film machine (trade name: "FITZ") manufactured by The Ichikin, Ltd. that can perform stretching and shrinking at the same time, for example. According to this machine, a stretch ratio in the machine direction (the longitudinal direction of the film=the direction in which the film travels in the machine) and a stretch ratio in the cross direction (the width direction=the direction perpendicular to the traveling direction of the film) can be set as desired, and also a shrinkage ratio in the machine direction (the longitudinal direction) can be set as desired. Accordingly, this machine allows stretching and shrinking to be performed at the same time under desired conditions. Also, it is possible to use biaxial stretching machines that control a stretch ratio in the width direction by suitably combining generally-known control methods such as a rail width control method, a pantographic control method, and a method in which the speed of the film traveled by a linear motor is controlled and also the length of the film in the longitudinal direction is controlled by changing the distance between clips holding ends of the film, for example.

The temperature at which the stretching and shrinking are performed is not particularly limited, and can be determined as appropriate depending on the kind of the polymer film. However, it is preferable to set the temperature depending on the glass transition point of the polymer film, for example. For example, it is preferable that the temperature is within ±30° C. from the glass transition point, more preferably ±20° C. from the glass transition point, and particularly preferably ±10° C. from the glass transition point.

According to the above-described production method, it is possible to obtain a birefringent film of the present invention from the polymer film. The birefringent film achieves excellent uniformity in properties such as birefringence, retardation, and an alignment axis, especially in these properties in the width direction. Note here that, although values of the birefringence and the retardation of the birefringent film vary depending on, for example, the material of the polymer film used, the stretch ratio, etc., the birefringent film produced so as to satisfy the requirement represented by the formula (1) above can achieve excellent uniformity in the birefringence and the retardation, regardless of the magnitude of the birefringence and the retardation.

In the birefringent film, accuracy in in-plane retardation "$(n_x-n_y) \cdot d$", i.e., the variation in the retardation, preferably is within the range from −9% to +9%, more preferably from −8% to +8%, and still more preferably −7% to +7%, for example. On the other hand, accuracy in retardation "$(n_x-n_z) \cdot d$" in the thickness direction preferably is within the range from −7% to +7%, more preferably −6% to +6%, and still more preferably −5% to +5%, for example. The accuracies in the respective retardations can be measured in the following manner. First, values of in-plane retardation and retardation in the thickness direction are measured at each of seven measuring points, which correspond to points dividing the width of the birefringent film into eight equal parts and at an equal distance from each end of the film in the longitudinal direction. Average values of the obtained measured values for the in-plane retardation and the retardation in the thickness direction are calculated, respectively. Then, assuming that the respective average values are 100%, the difference between the average value of the in-plane retardation and each of the measured values for the in-plane retardation and the difference between the average value of the retardation in the thickness direction and each of the measured values for the retardation in the thickness direction are calculated as accuracies (%) of the in-plane retardation and the retardation in the thickness direction.

In the birefringent film of the present invention, it is preferable that the variation in alignment axis angle in the X-axis direction (the slow axis direction) is not more than 5°, more preferably not more than 4°. According to the above-described method, the variation in the axis angle can be controlled so as to be within the above-described range, so that the uniformity in refractive index can be improved. Note here that the alignment axis angle means variation in the slow axis and can be calculated automatically by an automatic birefringence analyzer (trade name: KOBRA-21ADH; manufactured by Oji Scientific Instruments), for example, and the variation can be represented as a difference between the maximum measure value and the minimum measured value when the alignment axis angles are measured at the plurality of points (seven points) in the same manner as that for the above-described measurement of the retardations, for example. In the present invention, the width direction exhibiting a greater change ratio is regarded as the slow axis direction.

The thickness of the birefringent film varies depending on the thickness of the polymer film used, the stretch ratio, etc., but generally is in the range from 5 to 500 μm, preferably from 10 to 350 μm, and more preferably from 20 to 200 μm.

The method for producing the birefringent film is not limited to the above-described method. For example, the birefringent film may be produced by forming a polymer film made of a non-liquid crystal polymer as described above on a base and then subjecting this laminate to a stretching treatment and a shrinking treatment at the same time. In this case, the laminate of the base and the polymer film may be stretched and shrunk at the same time as will be described later, or alternatively, only the base included in the laminate may be stretched and shrunk, thereby treating the polymer film indirectly. Also, only the polymer film may be treated after it has been peeled off from the base.

In the following, an example in which a polymer film is formed directly on a base will be described. First, a material for forming a polymer film is dispersed or dissolved in a solvent to prepare a coating solution. The concentration of the material in the coating solution is not particularly limited, but preferably is 0.5 wt % to 50 wt %, more preferably 1 wt % to 40 wt %, and particularly preferably 2 wt % to 30 wt %, for example, so that the coating solution has a viscosity allowing the solution to be coated easily. Specifically, when the material is a non-liquid crystal polymer, the amount of the polymer to be added preferably is in the range from 5 to 50 parts by weight, more preferably 10 to 40 parts by weight with respect to 100 parts by weight of the solvent.

There is no particular limitation on the solvent. The solvent can be determined suitably according to a type of the material of a polymer film. However, it is preferable to use a solvent that can dissolve the material and hardly corrodes the base. Specific examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; and carbon disulfide, ethyl cellosolve, butyl cellosolve, and sulfuric acid. These solvents may be used alone or in the form of a mixture of two or more.

In the coating solution, various additives such as surfactants, stabilizers, plasticizers, metals and the like further may be blended as necessary.

Moreover, the coating solution may contain other resins as long as the aligning property of the material does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like. When the above-described other resins are blended in the coating solution as mentioned above, the blend amount ranges, for example, from 0 wt % to 50 wt %, preferably from 0 wt % to 30 wt %, with respect to the material.

Next, the prepared coating solution is coated onto a surface of the base to form a coating layer of the material. Examples of the method of coating the coating solution on the base include spin coating, roll coating, printing, immersion, curtain coating, wire-bar coating, a doctor blade method, knife coating, tie coating, gravure coating, micro-gravure coating, offset gravure coating, lip coating, and spray coating. In the coating, polymer layers can be superimposed as required.

The thickness of the base is not particularly limited, but generally is 10 μm or more, preferably in the range from 10 to 200 μm, more preferably in the range from 20 to 150 μm, and particularly preferably in the range from 30 to 100 μm. When the thickness of the base is 10 μm or more, the base will have sufficient strength in the stretching and shrinking treatments that will be described later, so that the occurrence of unevenness or the like in the stretching and shrinking treatments can be suppressed sufficiently. On the other hand, it is preferable that the base has a thickness of 200 μm or less because the stretching treatment can be performed with suitable tensile force.

Thereafter, the coating layer formed on the base is dried. By drying the coating layer, the polymer film material is hardened on the base, thereby forming a polymer film directly on the base.

A drying method is not particularly limited but can be air drying or heat drying, for example. Conditions for drying can be determined suitably depending on the kind of the material, the kind of the solvent, etc., but the drying temperature is, for example, 40° C. to 250° C., preferably 50° C. to 200° C. The coating layer may be dried at a fixed temperature. Alternatively, the temperature may be increased or decreased gradually during the drying step. Though the drying time is not particularly limited, it may be, for example, from 10 seconds to 60 minutes, preferably from 30 seconds to 30 minutes The amount of the solvent of the polymer solution remaining in the polymer film after the drying preferably is not more than 5%, more preferably not more than 2%, and still more preferably not more than 0.2%, for example, because change in optical characteristics of the polymer film over time may be caused in proportion to the amount of the remaining solvent.

The thickness of the polymer film formed on the base is not particularly limited. However, in general, the thickness of the polymer film preferably is set in the range from 0.5 to 10 μm, more preferably from 1 to 8 μm, and particularly preferably 1 to 7 μm.

Subsequently, the polymer film formed on the base is subjected to a stretching treatment and a shrinking treatment at the same time under the above-described conditions. In this case, for example, only the polymer film may be stretched and shrunk directly, or alternatively, the laminate of the base and the polymer film may be stretched and shrunk. In particular, for the following reason, it is preferable to treat only the base. That is, when only the base is stretched and shrunk, the polymer film formed on the base is stretched and shrunk indirectly due to the stretching and shrinkage of the base. In general, uniform treatments can be carried out easily with respect to a single layer rather than a laminate. Therefore, when only the base is treated as described above, the base can be stretched and shrunk uniformly, which allows the polymer film on the base also to be stretched and shrunk uniformly.

Also, it is possible to treat only the polymer film after it has been peeled off from the base.

When the birefringent film of the present invention is formed on the base as described above, the laminate of the birefringent film and the base may be used, or the birefringent film peeled off from the base may be used as a single layer, for example. Also, after the birefringent film is peeled off from the base (hereinafter referred to as a "first base"), the birefringent film may be laminated (transferred) again on another base (hereinafter referred to as a "second base") that does not interfere with the optical characteristics of the birefringent film via an adhesive layer, for example.

The second base is not particularly limited as long as it has suitable flatness. Preferable examples thereof include glasses and polymer films that are transparent and optically isotropic. The polymer film may be made of, for example, polymethyl methacrylate, polymethacrylate, polystyrene, polycarbonate, polyethersulfone, polyphenylene sulfide, polyalylate, amorphous polyolefin, TAC, an epoxy resin, and a resin composition containing an isobutene/N-methyl maleimide copolymer and an acrylonitrile/styrene copolymer as described above. Among them, polymethyl methacrylate, polycarbonate, polyalylate, TAC, polyethersulfone, a resin composition containing an isobutene/N-methyl maleimide copolymer and an acrylonitrile/styrene copolymer, and the like are preferable. The second base may be optically anisotropic depending on the intended use thereof As the optically anisotropic base, a retardation film obtained by stretching a polymer film made of polycarbonate polystyrene, a norbornene-based resin or the like, a polarizing film, etc. may be used, for example.

With regard to the adhesive layer used when transferring the birefringent film as described above, it is only required that the adhesive layer can be used for optical uses. For example, an adhesive or a pressure-sensitive adhesive based on acrylic substances, epoxy, urethane or the like may be used for forming the adhesive layer.

Next, an optical film of the present invention is only required to include the above-described birefringent film of the present invention, and there is no limitation on the configuration thereof, e.g., whether or not the above-described base is included therein.

Preferably, the optical film of the present invention further includes a pressure-sensitive adhesive layer as an outermost layer. This facilitates adhesion of the optical film of the present invention with the other members such as the other optical layers and a liquid crystal cell, so that, for example, the optical film of the present invention can be prevented from being peeled off. The pressure-sensitive adhesive layer may be provided on one or both surfaces of the optical film of the present invention.

The material for forming the pressure-sensitive adhesive layer is not particularly limited. Examples of the material for forming the pressure-sensitive adhesive layer include pressure-sensitive adhesives based on acrylic substances, silicone, polyester and rubbers. Fine particles can also be blended into these materials in order to form an adhesive layer having a light-diffusion property. Among them, materials having excellent moisture-absorption and heat resistance are preferable. When the pressure-sensitive adhesive layer formed of a material with such properties is used in a liquid crystal display, for example, the liquid crystal display can have high quality and excellent durability, since foaming and peeling caused by moisture absorption, degradation in optical characteristics, warping of a liquid crystal cell caused by a difference in the thermal expansion or the like, etc. can be prevented.

The optical film of the present invention may be composed of a birefringent film of the present invention alone as mentioned above or may be a laminate of a birefringent film of the present invention and one or more other optical members as necessary. The other optical member(s) is (are) not particularly limited, and examples thereof include other birefringent films, other retardation films, liquid crystal films, light scattering films, lens sheets, diffraction films, and polarizing plates.

When the optical film of the present invention includes a polarizing plate, the polarizing plate may be composed of a polarizer alone of may include a transparent protective layer on one or both surfaces of the polarizer.

The optical film of the present invention can be used preferably for forming various devices such as a liquid crystal display. For example, the optical film of the present invention may be arranged on at least one surface of a liquid crystal cell in order to form a liquid crystal panel for use in a liquid crystal display. The method of arranging the optical film is not particularly limited, and may be arranged in the same manner as that for arranging an optical film including a conventional birefringent film.

A liquid crystal cell to compose the liquid crystal display can be selected arbitrarily. For example, it is possible to use various liquid crystal cells of an active matrix driving type such as a thin film transistor or MIM, an IPS driving type, a plasma addressing driving type, and a simple matrix driving type represented by a twist nematic type and a super twist nematic type. Specific examples of the liquid crystal cell include STN (Super Twisted Nematic) cells, TN (Twisted Nematic) cells, IPS (In-Plane Switching) cells, VA (Vertical Nematic) cells, OCB (Optically Controlled Birefringence) cells, HAN (Hybrid Aligned Nematic) cells, ASM (Axially Symmetric Aligned Microcell) cells, ferroelectric cells, anti-ferroelectric cells, and those subjected to systematic alignment-division or random alignment-division.

The liquid crystal display including an optical film of the present invention may be of a transmission type including a backlight system, a reflection type including a reflection plate, or a projection type, for example.

The optical film of the present invention can be used not only in the above-described liquid crystal displays but also in, for example, self-light-emitting displays such as an organic electroluminescence (EL) display, a PDP and a FED. In this case, the configuration of the self-light-emitting displays is not limited as long as an optical film of the present invention is used instead of a conventional optical film.

Hereinafter, the present invention will be described more specifically by way of examples and comparative examples. However, the present invention is not limited to the following examples. Note here that various characteristics of a birefringent film mentioned in the following examples and comparative examples were measured in the following manner.

(Measurement of Birefringence, Retardation, and Axis Angle Distribution)

An automatic birefringence analyzer (trade name: KOBRA-21ADH; manufactured by Oji Scientific Instruments) was used to measure the birefringence, retardation, and axis angle distribution at a wavelength of 590 nm.

(Measurement of Film Thickness)

The thickness of a birefringent film was measured using an instant multiple photometry system (trade name: MCPD-2000; manufactured by Otsuka Electronics Co., Ltd.).

EXAMPLE 1

Using a high-performance thin film machine (trade name: "FITZ"; manufactured by The Ichikin, Ltd.), an unstretched polycarbonate film (manufactured by Kaneka Corporation) having a thickness of 68 μm and a width of 330 mm continuously was stretched in the width direction while being shrunk in the longitudinal direction, thus forming a birefringent film. Note here that the above treatment was carried out at a temperature of 160° C. so that the STD in the width direction would be 1.2 and the SMD in the longitudinal direction would be 0.93. The value of $(1/STD)^{1/2}$ was 0.913, so that the requirement represented by the formula (1) above was satisfied. With regard to this birefringent film, variation in alignment axis angle in the width direction, in-plane retardation ($\Delta nd=(nx-ny)\cdot d$) as well as variation therein, retardation ($Rth=(nx-nz)\cdot d$) in the thickness direction as well as variation therein were measured in the above-described manner, and the occurrence of wrinkles and cracks was observed visually. The results are shown in Table 2 below. In Table 2, variation in alignment axis angle denotes a difference between the maximum measured value and the minimum measured value among the measured values obtained at seven measuring points. Also, note here that nx, ny and nz respectively represent refractive indices in an X-axis direction (i.e., a slow-axis direction), a Y-axis direction, and a Z-axis direction in the birefringent film, with the X-axis direction being an axial direction exhibiting a maximum refractive index within a plane of the birefringent film, the Y-axis direction being an axial direction perpendicular to the X axis within the plane, and the Z-axis direction being a thickness direction perpendicular to the X axis and the Y axis, and d represents a thickness of the birefringent film.

Comparative Example 1

A birefringent film was produced in the same manner as in Example 1 except that the unstretched polycarbonate film was stretched uniaxially so that the STD in the width direction would be 1.2, without causing shrinkage in the longitudinal direction. Also, characteristics of the thus-obtained birefringent film were examined in the same manner as in Example 1. The results are shown in Table 2 below. In this comparative example, SMD=1.

Comparative Example 2

A birefringent film was produced in the same manner as in Example 1 except that the STD in the width direction was set to 1.2 and the SMD in the longitudinal direction was set to 0.9, so that $(1/STD)^{1/2}$ would be 0.913. Also, characteristics of the thus-obtained birefringent film were examined in the same manner as in Example 1. The results are shown in Table 2 below. In this birefringent film, $(1/STD)^{1/2}>SMD$.

EXAMPLE 2

As a material for forming a polymer film, polyimide (Mw=120000) whose repeating unit was represented by the general formula (6) below was synthesized from 2,2'-bis(3,4-dicarboxyphenyl)hexafluoropropane dianhydride (6FDA) and 2,2'-bis(trifluoromethyl)-4,4'-diaminobiphenyl (PFMB). Then, this polyimide was dissolved in MIBK to prepare a 20 wt % polyimide solution. The thus-obtained polyimide solution was continuously coated on a TAC film (trade name: TF80UL; manufactured by Fuji Photo Film Co., Ltd.) (400 mm in width, 40 μm in thickness) by blade coating. The polyimide coating layer was dried at 120° C. for 2 minutes, thus forming a polyimide film having a thickness of 6.0 μm. This polyimide film had birefringence exhibiting optical uniaxiality (nx=ny>nz), an in-plane retardation of 0.4 nm, and a retardation in the thickness direction of 248 nm. Moreover, a laminate of the base and the polyimide film was continuously stretched in the width direction while being shrunk in the longitudinal direction, thus forming a birefringent film. Note here that the above treatment was carried out at a temperature of 160° C. so that the STD in the width direction would be 1.1 and the SMD in the longitudinal direction would be 0.97. The value of $(1/STD)^{1/2}$ was 0.953, so that the requirement represented by the formula (1) above was satisfied. Note here that the above-described stretching in the width direction and shrinking in the longitudinal direction caused substantially no retardation in the base. With regard to this birefringent film, the respective characteristics were examined in the same manner as that in Example 1. The results are also shown in Table 2 below.

[Chemical formula 18]

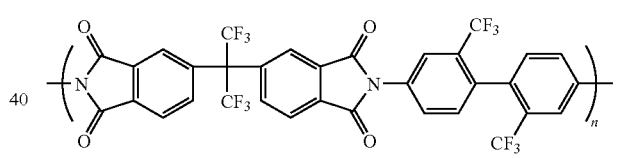

(6)

Comparative Example 3

A birefringent film was produced in the same manner as in Example 2 except that the laminate was stretched uniaxially so that the STD in the width direction would be 1.1, without causing shrinkage in the longitudinal direction. Also, characteristics of the thus-obtained birefringent film were examined in the same manner as in Example 2. The results are shown in Table 2 below. In this comparative example, SMD=1.

Comparative Example 4

A birefringent film was produced in the same manner as in Example 2 except that the STD in the width direction was set to 1.1 and the SMD in the longitudinal direction was set to 0.9, so that $(1/STD)_{1/2}$ would be 0.913. Also, characteristics of the thus-obtained birefringent film were examined in the same manner as in Example 2. The results are shown in Table 2 below. In this birefringent film, $(1/STD)^{1/2}>SMD$.

TABLE 2

| | Variation in alignment axis angle (°) | Δnd (nm) | Variation in Δnd (%) | Rth (nm) | Variation in Rth (%) | Appearance |
|---|---|---|---|---|---|---|
| Ex. 1 | 3.6 | 218.6 | ±10.5 | 284.8 | ±12.1 | No abnormalities |
| Comp. Ex. 1 | 20.6 | 173.7 | ±18.2 | 394.1 | ±22.5 | No abnormalities |
| Comp. Ex. 2 | 8.1 | 235.1 | ±15.3 | 301.4 | ±17.2 | wrinkles were formed |
| Ex. 2 | 2.3 | 49.7 | ±3.2 | 250.7 | ±3.0 | No abnormalities |
| Comp. Ex. 3 | 11.3 | 50.9 | ±10.4 | 309.2 | ±25.5 | No abnormalities |
| Comp. Ex. 4 | 4.3 | 63.0 | ±10.1 | 261.4 | ±8.5 | wrinkles were formed |

As shown in Table 2, in the birefringent film of Example 1 in which the stretching and shrinking were performed so as to satisfy the requirement represented by the formula (1), variations in the alignment axis angle, Δnd and Rth were significantly smaller than those in the birefringent film of Comparative Example 1 in which only the stretching in the width direction was performed. Furthermore, in the birefringent film of Comparative Example 2 in which the stretching and shrinking did not satisfy the requirement represented by the formula (1) though they were performed at the same time, wrinkles were formed in the width direction. In contrast, the birefringent film of Example 1 was advantageous not only in that variations in Δnd and Rth were suppressed but also in that excellent appearance could be achieved. On the other hand, with regard to the birefringent film of Example 2 formed as a laminate of the base and the polyimide film, since the stretching and shrinking were performed so as to satisfy the requirement represented by the formula (1), variations in the alignment axis angle, Δnd and Rth were significantly smaller than those in the birefringent film of Comparative Example 3 in which only the stretching in the width direction was performed. Furthermore, in the birefringent film of Comparative Example 4 in which the stretching and shrinking did not satisfy the requirement represented by the formula (1) though they were performed at the same time, wrinkles were formed in the width direction. In contrast, the birefringent film of Example 2 was advantageous not only in that variations in Δnd and Rth were suppressed but also in that excellent appearance could be achieved. Based on these results, it can be said that the method of the present invention can produce a birefringent film that has not only excellent appearance but also excellent uniformity in optical characteristics with variations in alignment axis angle, in-plane retardation, retardation in the thickness direction, etc. being suppressed, and thus, such a birefringent film can contribute to the improvement in display characteristics of various image displays such as a liquid crystal display. Moreover, because the method of the present invention allows a birefringent film with excellent appearance and optical characteristics to be obtained even when a polymer film is stretched in the width direction, the method of the present invention is particularly useful, for example, when attaching the birefringent film and a polarizing film to each other continuously in the state where the slow axis of the birefringent film is parallel to the transmission axis of the polarizing film as described above.

INDUSTRIAL APPLICABILITY

As specifically described above, by carrying out the stretching in the width direction and the shrinking in the longitudinal direction so as to satisfy the requirement represented by the formula (1) above, it is possible to obtain a birefringent film that is excellent in appearance and optical characteristics with its birefringence and retardations in the in-plane direction and the thickness direction being uniform. The birefringent film with such excellent optical characteristics can be used suitably in various optical films, for example, and when it is used in various image displays such as a liquid crystal display, it can realize excellent display characteristics.

The invention claimed is:

1. A method for producing a birefringent film, comprising the step of stretching a polymer film,
    wherein, in the step of stretching the polymer film, the polymer film is stretched in a width direction while being shrunk in a longitudinal direction, and
    wherein based on the lengths in the width direction and the longitudinal direction of the polymer film before being stretched, a change ratio (STD) of the length in the width direction of the polymer film resulting from the stretching and a change ratio (SMD) of the length in the longitudinal direction of the polymer film resulting from the shrinking satisfy a relationship represented by the following formula (1)

$$1/(STD)^{1/2} < SMD < 1 \qquad (1), \text{ and}$$

wherein the slow axis of the birefringent film is in a direction that coincides with the width direction of the polymer film.

2. The method according to claim 1, wherein the SMD is less than 0.99.

3. The method according to claim 1, wherein the $(1/STD)^{1/2}$ is less than 0.99.

4. The method according to claim 1, wherein when the STD is 1.2, the SMD is in a range from 0.9 to 0.92.

5. The method according to claim 1, wherein when the STD is 1.3, the SMD is in a range from 0.86 to 0.90.

6. The method according to claim 1, wherein, after the polymer film is formed on a base directly, the polymer film is subjected to the stretching treatment and the shrinking treatment at the same time.

7. The method according to claim 6, wherein the base is subjected to the stretching treatment and the shrinking treatment at the same time, thereby stretching and shrinking the polymer film on the base.

* * * * *